United States Patent
De Kock

(10) Patent No.: US 7,766,137 B2
(45) Date of Patent: Aug. 3, 2010

(54) NONRETURN VALVE FOR A SHOCK ABSORBER

(75) Inventor: Paul De Kock, Numansdorp (NL)

(73) Assignee: Koni B.V. (NL)

( * ) Notice: Subject to any disclaimer, the term of this patent is extended or adjusted under 35 U.S.C. 154(b) by 344 days.

(21) Appl. No.: 11/802,468

(22) Filed: May 23, 2007

(65) Prior Publication Data

US 2008/0041682 A1 Feb. 21, 2008

(51) Int. Cl.
*F16F 9/34* (2006.01)

(52) U.S. Cl. .............................. 188/322.15; 188/282.6; 188/313; 188/316

(58) Field of Classification Search ............ 188/322.15, 188/322.13, 322.14, 313, 316, 317, 282.6, 188/282, 8; 92/172, 183; 137/614.2, 516.11, 137/516.13, 493.9; 251/336, 337
See application file for complete search history.

(56) References Cited

U.S. PATENT DOCUMENTS

| 3,831,626 | A   |   | 8/1974  | Peddinghaus            |
|-----------|-----|---|---------|------------------------|
| 4,203,507 | A   | * | 5/1980  | Tomita et al. ...... 188/317 |
| 4,401,196 | A   | * | 8/1983  | Grundei ............ 188/282.6 |
| 4,610,332 | A   | * | 9/1986  | Mourray .......... 188/322.15 |
| 4,821,852 | A   | * | 4/1989  | Yokoya ............ 188/322.15 |
| 5,042,624 | A   | * | 8/1991  | Furuya et al. ......... 188/280 |
| 5,085,300 | A   | * | 2/1992  | Kato et al. ........ 188/282.6 |
| 5,115,892 | A   | * | 5/1992  | Yamaoka et al. .... 188/282.5 |
| 5,316,113 | A   | * | 5/1994  | Yamaoka ........... 188/282.6 |
| 5,413,195 | A   |   | 5/1995  | Murakami               |
| 5,529,154 | A   | * | 6/1996  | Tanaka ............... 188/282.6 |
| 6,155,391 | A   | * | 12/2000 | Kashiwagi et al. ... 188/266.6 |
| 6,540,052 | B2  | * | 4/2003  | Fenn et al. ......... 188/322.15 |
| 7,143,684 | B2  | * | 12/2006 | Dourson et al. ............ 91/422 |
| 2005/0211087 | A1 |  | 9/2005  | Dourson et al.         |
| 2005/0279597 | A1 |  | 12/2005 | Yamaguchi             |

FOREIGN PATENT DOCUMENTS

| EP | 0 717 191 A2 | 6/1996 |
| GB | 909798 | 11/1962 |
| GB | 2 118 686 | 11/1983 |
| JP | 52-014182 | 2/1977 |
| JP | 58-211038 | 12/1983 |
| WO | WO 96/15389 | 5/1996 |

* cited by examiner

*Primary Examiner*—Robert A Siconolfi
*Assistant Examiner*—Mariano Sy
(74) *Attorney, Agent, or Firm*—RatnerPrestia

(57) ABSTRACT

Shock absorber provided with a piston and a cylinder, both secured to a part of a vehicle. A nonreturn valve is present in either the piston or the base of the cylinder. The nonreturn valve includes a valve plate and a valve seat plate, both annular. Near the center, the valve plate is arranged at a distance from the valve seat plate. At low flow velocity, elasticity of the valve plate keeps it at a distance from the valve seat plate, allowing unimpeded flow. As flow increases, the valve plate deforms elastically, gradually closing off a diametral opening in the valve seat plate. An opening remains between the valve plate and the valve seat plate at the spacer. As the pressure difference across the nonreturn valve increases, the valve plate closes off with respect to the valve seat plate over the entire circumference. This movement takes place as a wave.

13 Claims, 4 Drawing Sheets

NONRETURN VALVE FOR A SHOCK ABSORBER

FIELD OF THE INVENTION

The present invention relates to a shock absorber having a non-return valve for restricting the outward movement of the piston from the cylinder.

BACKGROUND OF THE INVENTION

A nonreturn valve of this type is used to realize the difference between the compression and rebound movement of a shock absorber. This is because during the compression movement the shock absorber must impart less flow resistance to the fluid that is to be displaced from one side of the piston to the other side of the piston, i.e. from the second chamber to the first chamber. During the rebound movement, there should be a greater resistance, which constitutes a significant part of the shock-absorbing action of the shock absorber. Various types of shock absorbers have been proposed for this purpose in the prior art.

In JP 58211038 a damper is disclosed. Above (i.e. the direction of moving the piston from the cylinder) the valve seat and the plates acting thereon, a spring-loaded auxiliary structure is provided. This auxiliary structure comprises a ring having a smaller external diameter than the surrounding housing, so that there is always a fluid connection along said spring-loaded structure. A valve plate can be moved there against, being provided at the inner circumference thereof with radially extending projections. The recesses realised in this way do not cooperate with the seat as described above, but cooperate with a further plate assembly being positioned under the flexible plate.

In US 2005/0211087 prior art is discussed, comprising a shock absorber wherein during outward movement of the securing means at the extremities of the shock absorber, a normally open flow passage is closed by a flexible valve plate being displaced against a seat. This closing movement is effected in a single step, i.e. all along the circumference of the displaceable valve plate at a single moment sealing on the valve seat is effected.

The subject invention aims to provide a shock absorber wherein the closing movement described above at moving from each other of the securing means is effected more gradually in order to provide a higher comfort.

SUMMARY OF THE INVENTION

According to a first aspect of the subject invention a shock absorber is provided comprising a cylinder, a piston which is displaceable therein and a piston rod connected to said piston, wherein said piston rod and cylinder are provided with securing means for securing them to a vehicle, said piston dividing said cylinder into two cylinder chambers, being a first chamber that is also delimited by said piston rod and a second chamber, and comprising a nonreturn valve, said nonreturn valve comprising a displaceable valve plate and a valve seat that interacts with said valve plate, embodied such that at a low flow velocity said valve substantially does not close in both directions of flow, and at a higher velocity it closes in the direction of moving of the piston from the cylinder, wherein the valve plate is more flexible than the valve seat and at displacement of the piston from the cylinder the first position on said valve plate effects a more early closing movement than a second position on said valve plate, wherein said valve seat delimits an opening, wherein the boundary of said opening of said valve seat seals both with said first and said second position of said valve seat.

According to subject invention the opening in the valve seat is not closed in a single moment. For closing the part in the first position a smaller fluid displacement (pressure difference) than for closing the part in the second position is necessary. Through the transfer of closing between the first and second position gradual throttling of the fluid flow is effected in proving the feeling of comfort.

According to the invention because of the lower resistance against the pressure difference the part in the first position will reach during closing movement as first the valve seat followed by the part in the second position. This part in the second position could close somewhat later at a higher pressure difference, i.e. fluid flow.

According to the present invention, the nonreturn valve only becomes active after a certain flow velocity of the liquid moving through the passage has been exceeded. Preferably, the valve plate will only move towards the valve seat and execute a closure movement at a flow velocity above 4 $cm^3/s$.

This closure characteristic can be realized in any conceivable way. According to an advantageous embodiment, this is realized in that in the at-rest state the valve plate is arranged at a distance, more particularly a distance of at least 0.05 mm, from the valve seat. Under the influence of the flow of fluid, and in particular on account of the formation of pressure differences, on a defined threshold value being exceeded, the valve plate will be moved towards the opening in the valve seat. A movement of this type is preferably gradual, i.e. the opening is gradually closed. As a result, at a low flow velocity, there is no shock-absorbing action whatsoever, and this shock-absorbing action will then increase continuously as the velocities get ever higher, resulting in a comfortable ride. On the other hand, if the shock absorber actually has to perform a shock-absorbing action at major displacements, a shock-absorbing action which corresponds to that of a conventional shock absorber will be obtained.

According to a particular embodiment of the invention, the valve plate is a flat plate which is held at a distance from the valve seat with a spacer arranged against the valve seat. It is preferable for the valve seat likewise to be designed as a flat plate, in which a number of openings, preferably diametrally oriented openings, are present. The shock-absorbing characteristics can be influenced by changing the number of openings, the size of the openings and the pattern in which said openings are arranged. One simple step is to vary the number of openings and/or the size of openings arranged in the valve seat plate. It is in this way possible to provide optimum ride properties according to the vehicle and the desired shock-absorbing action.

According to the present invention, in a particular variant a continuously increasing shock-absorbing action is obtained. At a low flow velocity or in the at-rest state, the valve plate will be located at a distance from the valve seat plate and more particularly the opening arranged therein. According to the present invention, the valve plate is designed to be flexible, in such a manner that as the velocity increases, the valve plate does not in its entirety move towards the opening in the valve seat, but rather is forced towards the valve plate in particular at the location of the opening in the valve seat (wave action). This means that if a number of openings are present in the valve seat plate, the valve plate will be driven towards the valve seat plate to a lesser extent between these openings. As a result, a flow passage always remains between the openings (preferably in the diametral direction) and at the location of the spacer. After all, at the location of the spacer, the valve plate cannot move towards the valve seat plate and an opening always remains. A circumferential passage will be formed there. If the pressure difference across the nonreturn valve increases further, the above-described wave action, i.e. elastic deformation of the valve plate at the location of the opening and to a lesser extent in the region between the openings, will be reversed and the valve plate will be pressed onto the valve seat plate over the entire circumference, away from the spacer, resulting in substantially complete closure of the nonreturn valve. As a result, the valve plate executes a type of rolling motion.

It has been found that in this way not only is it possible to obtain a greater level of comfort, but also, at higher shock-absorber velocities, if desired a stiff shock-absorbing action can be obtained. It has also been observed that the noise transmitted by the shock absorber, i.e. road noise transmitted to the vehicle body, is partly isolated. The gradual transition leads to a further reduction in noise.

In addition to varying the shape, position and number of openings in the valve seat plate and the "height" of the associated slots, it is also possible to control the shock-absorbing characteristics by varying the distance from the valve seat to the valve seat plate, the rigidity of the valve plate and the at-rest position of the valve plate with respect to the valve seat plate.

The nonreturn valve may be arranged either in the cylinder or in the piston. If it is arranged in the cylinder, it has the function of feeding oil from the reservoir and closing during the inwards movement, during which oils flows into the reservoir (bottom valve function of a shock absorber with two tubes between which a reservoir is delimited).

According to a further aspect the present invention relates to a method for closing the opening of a nonreturn valve in a shock absorber, said nonreturn valve comprising a valve seat and a valve plate arranged such that it can cover said valve seat, with a spacer being arranged on one side between the valve seat and the valve plate wherein during a first closure step said valve plate is pressed onto said valve seat in the immediate vicinity of the opening in said valve seat, leaving clear an opening in the vicinity of said spacer, and wherein during a second, further step, said valve plate is pressed onto said valve seat at a greater distance from said opening in said valve seat.

BRIEF DESCRIPTION OF THE DRAWINGS

The invention will be explained in more detail below with reference to an exemplary embodiment illustrated in the drawing, in which.

DETAILED DESCRIPTION OF THE INVENTION

Figure 1:
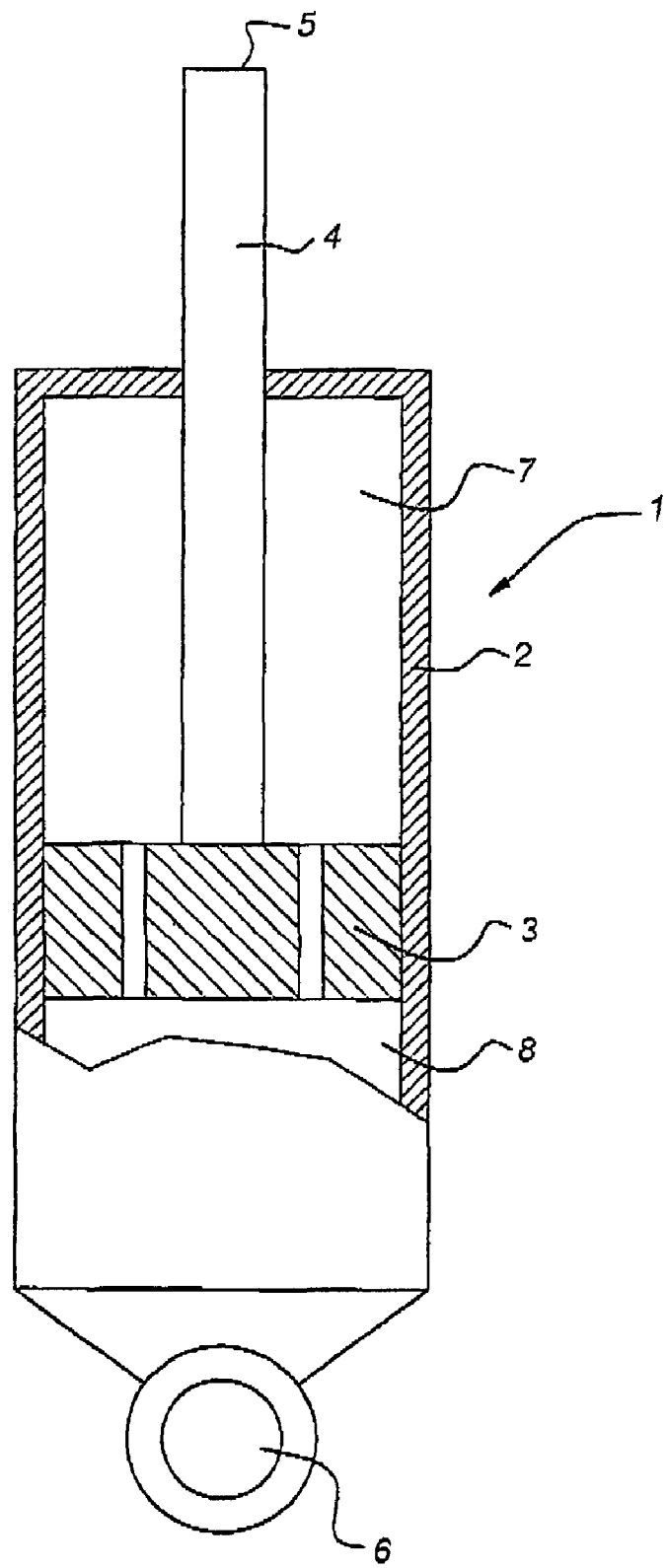
FIG. 1 diagrammatically depicts a cross section through a shock absorber according to the invention.

FIG. 1 shows, in general terms, a shock absorber, which is denoted overall by 1. It comprises a cylinder 2 with a displaceable piston 3 arranged therein, which cylinder is connected to a piston rod 4 at the end at which there is a securing point 5 for attachment to the vehicle. The cylinder 2 is provided with a securing point 6. The piston delimits a first chamber 7 and a second chamber 8. In the drawing, the various passages through the piston are only diagrammatically indicated. If appropriate, the shock absorber may be provided with what is known as a bottom valve. The nonreturn valve, which is to be described with reference to the accompanying figure, according to the invention can be used both in the piston in the passages shown and at the base. In the case of a b valve, of course, there will be an auxiliary reservoir for shock absorber fluid, which can be realized by fitting a further cylinder concentrically around the cylinder 2 or a separate reservoir.

Figure 2:
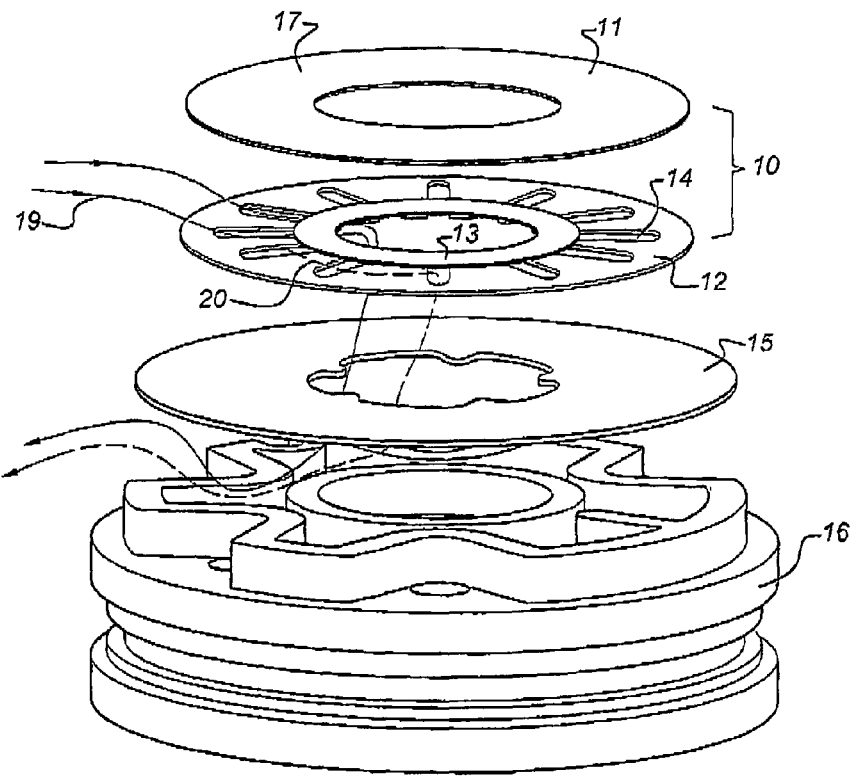
FIG. 2 shows exploded details of the nonreturn valve mounted in the piston of the shock absorber shown in FIG. 1.
Figure 3:
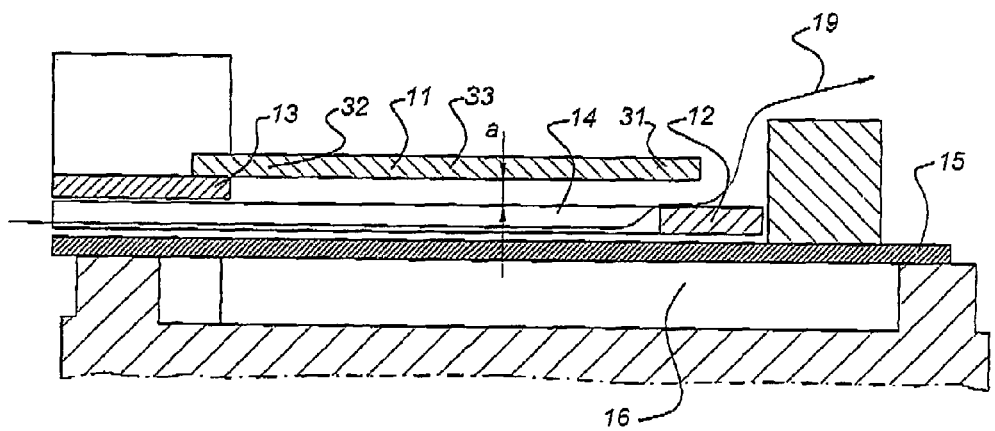
FIG. 3 shows parts as shown in FIG. 2 but in the assembled state.

FIGS. 2 and 3 show details of the nonreturn valve arranged at the top side of the piston 3. This nonreturn valve is denoted overall by 10 and comprises a valve plate 11 made from a flexible material and valve seat plate 12. Openings, denoted by 14, are arranged in the valve seat plate 12. These are diametrally extending openings. A spacer ring 13 is arranged between the valve seat plate 12 and the valve plate 11. The circumference of the valve plate 11 is denoted by 17. Beneath the valve seat plate 12 is a support plate 15, which is connected to the piston 16. The piston comprises a piston body 16 and the nonreturn valve 10 arranged thereon. It should be understood that further passages, which influence the shock-absorbing characteristics, may be present in the piston.

It can be seen from FIG. 3 that in the loaded condition, i.e. in the absence of any flow of fluid, the presence of the spacer 13 means that the valve plate 11 is located at a distance a from the valve seat plate. According to the present invention, this distance a is between 0.05 and 0.5 mm, and in the exemplary embodiment illustrated this distance, in the loaded condition, is approximately 0.3 mm.

The nonreturn valve is embodied in such a manner that it does not constitute any obstacle while the piston 3 is moving downwards in FIG. 1, i.e. if the wheel of a vehicle strikes an obstacle. The action of the nonreturn valve 10 is only important during the return movement, i.e. if fluid flows out of the first chamber 7 to the second chamber 8. If this flow of fluid is not excessively great, the velocity difference across the valve plate 11 will be low, with the result that this plate does not move or scarcely moves towards the valve seat plate. This is indicated by the solid line 19 in FIGS. 2 and 3. This means that when a small obstacle being encountered, the return movement of the shock absorber (rebound) will not be subject to any shock-absorbing action, which is considered comfortable.

Figure 4:
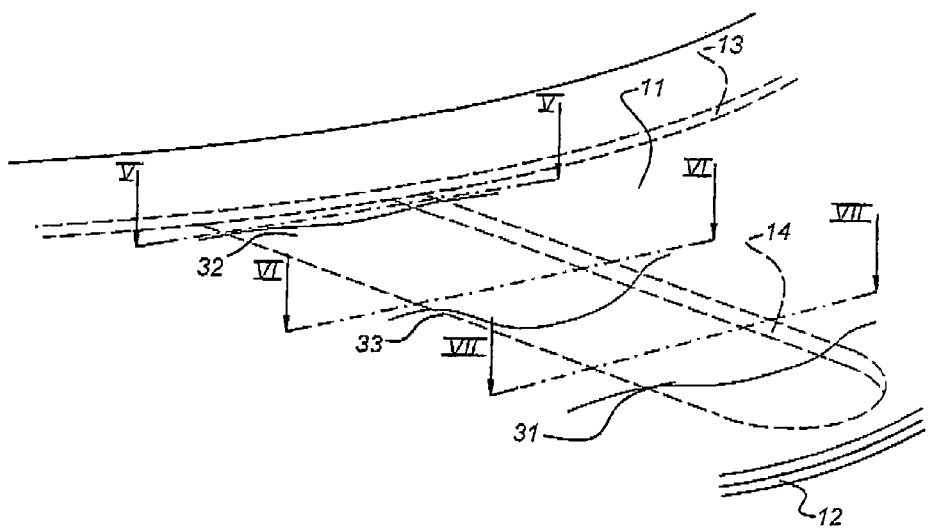
FIG. 4 shows a diagrammatic, partial cut-away perspective view of the position of the valve plate with respect to the valve seat plate.
Figure 5:
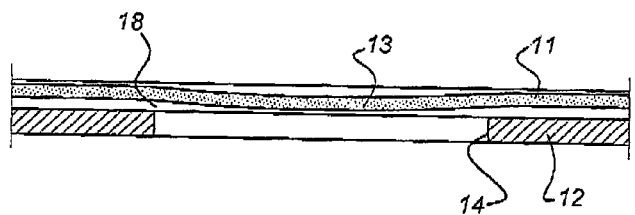
FIGS. 5-7 show the cross section from FIG. 4.
Figure 6:
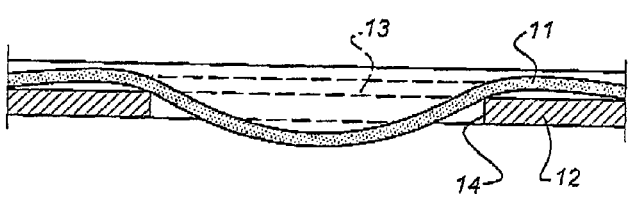
Figure 7:
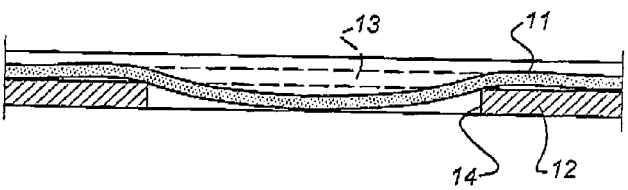

As soon as a greater flow velocity occurs, the pressure difference caused by the velocity difference will move valve plate 11 towards valve seat plate 12. However, since the valve plate 11 is elastically deformable, not all of the valve plate 11 will execute a downwards movement, but rather this movement will vary as a function of the distance to the openings 14. This means that in relative terms a greater elastic deformation of the valve plate will occur at the location of the openings 14 than in the regions between the openings 14. This is diagrammatically indicated in FIG. 4 and also shown in the associated cross sections in FIGS. 5-7. On account of the presence of the spacer 13, it will never be possible for the directly adjoining part of the valve plate to be moved onto the valve seat plate 11. This means that a free passage opening 18 always remains there.

Figure 8A:
FIG. 8 shows the evolution of the outer circumference of the nonreturn valve in various positions a-c.
Figure 8B:
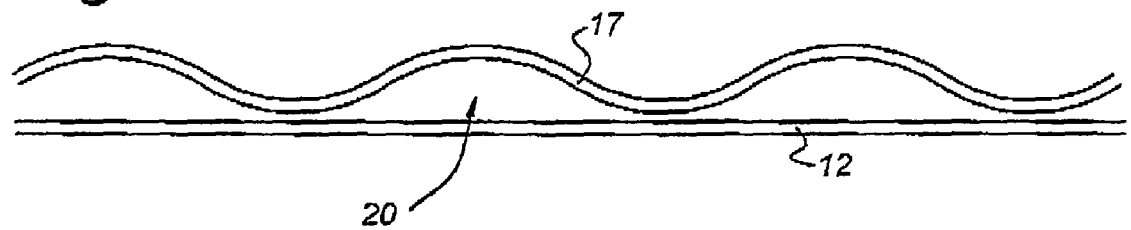
Figure 8C:
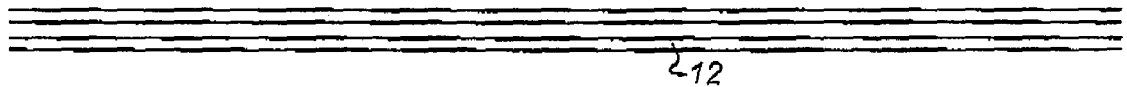

On account of the presence of the spacer, this above-described movement will lead to gradual closure of the openings 14 starting from the point 31 located closest to the circumference (first position) towards second position 32 near the centre where the spacer ring 13 is located, via the intermediate position 33. In first instance at 31 sealing will be effected, followed in time by sealing at 33 and finally at 32. Depending on the flow rate it is of course possible that only sealing at 31 or 33 will be effected. The final result at sufficient pressure difference will be the state in which opening 14 is completely closed apart from at opening 18. This gradual closure of the opening 14 makes the shock-absorbing action gradually become stiffer, i.e. the flow resistance of the shock-absorbing fluid gradually increases. FIG. 8 shows an excerpt from the circumference 17 of the valve plate 11, which clearly reveals that in the valve plate 11, as the flow velocity increases, a wave shape is gradually formed, which in the first instance closes the opening 14. As the pressure difference across the valve plate increases further, the valve plate 11 will be pressed onto the valve seat plate 12, certainly in the vicinity of the circumference 17. This process is shown in FIGS. 8a-c, wherein FIG. 8c shows the state in which the valve plate 11 and the valve seat plate 12 bear completely against one another at the outer circumference. In this state, it is impossible for fluid to flow between the valve plate 11 and valve seat plate 12. In the phase shown in FIG. 8b, the wave shape is present in the valve plate 11, but the opening 14 is completely closed apart from in the vicinity of the spacer 13. In that condition, fluid can still flow between the valve plate 11 and the valve seat plate 12, as indicated by the arrow 20 denoted by a dashed line.

The present invention provides very particular shock-absorbing characteristics. Specifically, at low liquid velocities across the nonreturn valve 10, no shock-absorbing action will occur. As the velocities increase, the gradual further closure of the opening will lead to an ever greater flow restriction, i.e. an ever stiffer shock-absorbing action, until the action opening 14 is completely closed apart from at 18. As the pressure difference across the valve plate 11 increases further, complete closure will take place at the circumference, with the result that no flow of fluid whatsoever is then possible.

It will be understood that there is a large number of possible variables allowing these shock-absorbing characteristics to be altered as desired. For example, it is possible to change the rigidity of the material of the flexible plate 11. Moreover, the thickness of the spacer can be varied, as can its diametral extent. The same applies to the openings 14, of which the number and shape can be varied.

Moreover, the present invention has the advantage that as soon as the flow stops or is reversed, there is a negligible delay in the nonreturn valve opening, since the resilience of the valve plate 11 will cause it to automatically move back into its at-rest position. As a result, the shock-absorbing characteristics can be quickly adapted.

The present invention allows the shock-absorbing action to be provided with the desired characteristics. For example, it is possible to make the inherently progressive characteristic of the constants, required to obtain the correct settings, linear by using the correct combination of valve set-up and grooves.

On reading the above, numerous variants will occur to a person skilled in the art. All kinds of existing shock-absorber designs can be combined with the proposal described above. Variants of this type are within the scope of the claims.

The invention claimed is:

1. A shock absorber including a cylinder, a piston displaceable within the cylinder, a piston rod connected to said piston, and a nonreturn valve, said piston dividing said cylinder into a first chamber including said piston rod and a second chamber, said nonreturn valve comprising:
   an elastically flexible valve plate;
   a valve seat plate having an opening, the opening having an edge defined by the valve seat plate, the valve seat plate being less flexible than the valve plate; and
   a spacer between the valve plate and the valve seat plate that keeps the valve plate spaced from the valve seat plate when the nonreturn valve is open,
   wherein at a first flow velocity through said nonreturn valve, the nonreturn valve substantially does not close,
   at a second flow velocity higher than the first flow velocity from the first chamber to the second chamber through the nonreturn valve, the nonreturn valve closes in a first closing state, wherein the valve plate contacts the edge of the opening of the valve seat plate at a first position,
   at a third flow velocity higher than the second flow velocity from the first chamber to the second chamber through the nonreturn valve, the nonreturn valve closes in a second closing state, wherein the valve plate contacts the edge of the opening of the valve seat plate at both the first position and a second position, and
   in the first and second closing states, the valve plate does not contact the edge of the opening of the valve seat plate at a third position immediately adjacent the spacer.

2. The shock absorber according to claim 1, wherein said opening comprises a diametral opening.

3. The shock absorber according to claim 1, wherein said valve seat plate comprises a plate shaped part.

4. The shock absorber according to claim 1, wherein said first flow velocity is less than 4 cm/s and said second flow velocity is more than 10 cm/s.

5. The shock absorber according to claim 1, wherein said spacer keeps the valve plate spaced from the valve seat plate at a distance of at least 0.05 mm when the nonreturn valve is open.

6. The shock absorber according to claim 1, wherein said valve plate is a flat plate.

7. The shock absorber according to claim 1, wherein said opening is arranged in the valve seat plate such that the opening is surrounded on all sides by said valve seat plate.

8. The shock absorber according to claim 7, wherein said valve plate comprises a ring, the outer circumferential edge of which can move onto said valve seat plate in such a manner as to form a seal.

9. The shock absorber according to claim 2, further including a plurality of spaced-apart diametral openings.

10. The shock absorber according to claim 1, wherein said nonreturn valve is arranged in said cylinder.

11. The shock absorber according to claim 1, wherein said nonreturn valve is arranged in said piston.

12. A method for closing the opening of a nonreturn valve in a shock absorber, which nonreturn valve comprises a valve seat plate having an opening and a valve plate arranged such that the valve plate can cover said valve seat plate, the opening of the valve seat plate having an edge defined by the valve seat plate, the nonreturn valve further comprising a spacer being arranged between the valve seat plate and the valve plate, the method comprising:
   a first closure step, wherein said valve plate is pressed onto the edge of the opening of said valve seat plate at a first position; and
   a second closure step, wherein said valve plate is pressed onto the edge of the opening of said valve seat plate at a second position,
   wherein in the first and second closure steps, the valve plate is not pressed onto the edge of the opening of the valve seat plate at a third position in the vicinity of said spacer.

13. The method according to claim 12, further comprising a transition step between said first and second closure steps wherein said valve plate is formed into a wave shape.

* * * * *